Aug. 5, 1969         E. E. MUELLER         3,459,601
HIGH TEMPERATURE READILY REMOVABLE PROTECTIVE CERAMIC
COATING COMPOSITIONS FOR METALS, AND RESULTING
COATED METAL ARTICLES
Filed April 3, 1964
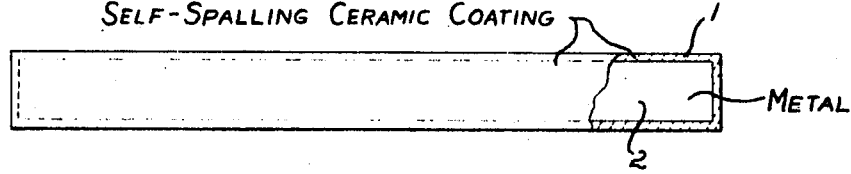
EDWARD E. MUELLER
INVENTOR
BY G. G. Christensen
ATT'Y United States Patent Office 3,459,601
Patented Aug. 5, 1969

3,459,601
HIGH TEMPERATURE READILY REMOVABLE PROTECTIVE CERAMIC COATING COMPOSITIONS FOR METALS, AND RESULTING COATED METAL ARTICLES
Edward E. Mueller, Baltimore, Md., assignor, by mesne assignments, to SCM Corporation, New York, N.Y., a corporation of New York
Filed Apr. 3, 1964, Ser. No. 357,135
Int. Cl. C23b 7/08; C23c 1/12; C09d 1/04
U.S. Cl. 148—22
19 Claims

ABSTRACT OF THE DISCLOSURE

Readily removable temporary coating compositions for metals to be heated to temperatures up to about 2400° F. for hot working are described. The coating compositions consist essentially of:

(A) A comminuted inorganic mixture consisting essentially of about 70 to about 95 weight percent of an alumina/alumino silicate material of the sillimanite minerals group and from about 30 to about 5 weight percent of sodium silicate having an $Na_2O:SiO_2$ ratio between about 1:1 and 3:10, by weight, said sodium silicate being calculated upon an anhydrous basis with respect to the foregoing weight proportions and being in a form selected from the group consisting of anhydrous sodium silicate powder, aqueous anhydrous sodium silicate, hydrous sodium silicate powder, aqueous hydrous sodium silicate, and mixtures thereof, and (B) An innocuous liquid carrier containing an organic polymeric binder material having a Conradson residue of less than about 3.5% by weight. The compositions are advantageous in that they form protective coatings which, when heated, protect metals against oxdiation and decarburization during hot working of the metal and which are readily removable from the metal after completion of the hot working and upon cooling of the metal.

Metal articles coated with dry coatings of the compositions are also described.

---

This invention relates to temporary ceramic coating compositions for metals which serve to protect the substrate metal from oxidation while heated at high temperatures for forging, rolling, heat-treating, etc. The coating compositions are inexpensive to use, can be self-removing when the substrate metal is cooled, and assure good protection to the substrate metal for moderately prolonged periods of time while being hot-worked or otherwise exposed to oxidizing conditions at temperatures up to about 2400° F.

In the processing of most steels and of many other types of metals which react at elevated temperatures with oxygen, nitrogen, hydrogen and/or carbon-containing gases, it is necessary at some stage to heat ingots, bars, billets, and other configurations in order to facilitate their fabrication into different shapes or to develop certain metallurgical properties. The temperatures involved are oftentimes high enough to cause deleterious reactions to occur unless preventative steps are taken. These detrimental reactions assume many forms but, most notably in iron alloys, they many involve oxidation or decarburization. In the case of oxidation particularly, considerable losses of metal are common in the form of the oxide coating which is developed. One method of alleviating this difficulty is through the use of a controlled atmosphere furnace. In instances where large sizes are encountered, however, the cost of such an operation can be prohibitive.

Another means for accomplishing the same end considerably more economically is through the use of temporary protective coatings. In general these protective coatings serve as a barrier between the metal substrate and the furnace or ambient atmosphere and prevent the diffusion of gasified materials from the metal into the atmosphere or, conversely, the passage of gaseous contaminants to the metal substrate.

Coatings of various types have been used extensively for metal protection on a more or less permanent basis. Such coatings have contained both organic and inorganic components and may also have comprised predominantly metallic constituents. Conventional porcelain enamels are also in widespread use for permanent protection purposes.

Ceramic coatings of a temporary nature which have been developed in past years, although satisfactory from the point of view of protection, have had some limitations which have been overcome in the materials to be described hereafter. For the most part, entirely different inorganic components are here used in order (1) to extend the use range to considerably higher temperatures and (2) to be utilizable in conjunction with the considerably more complex metal alloys which have been developed during recent years. In addition, organic components can be utilized as carriers for the inorganic materials. Through their use it has been possible to develop considerable handling resistance which is necessary in order to avoid coating damage from mechanical handling operations usually encountered in metal-working plants.

In order that such ceramic coatings may be made adaptable to a variety of metal-processing operations, they must have certain physical and chemical properties. Among these are the following:

(1) The consistency of the coating must be such as to permit application by spraying, brushing, or dipping.

(2) The coating must have a satisfactory long "shelf life," i.e., must be a stable suspension or dispersion, in order to prevent excessive settling.

(3) The coating must dry rapidly under ambient or force-dry conditions at moderately elevated temperatures.

(4) The coating must be resistant to severe handling operations.

(5) The coating should not evolve material(s) which would be harmful to heat-treating furnaces, other equipment, or personnel.

(6) The coating should be continuous at relatively low temperatures and maintain this continuity through the entire temperature range to which the metal is exposed.

(7) The viscosity of the coating at the desired elevated temperatures should be such as to prevent the diffusion of gaseous materials.

(8) The coating should be free from ingredients which would cause metal contamination or deterioration.

(9) The coating must be readily removable after the metal's heat treatment or exposure, either by chemical or mechanical means or by spontaneous thermal spalling.

(10) The coating must be compounded from materials such that its total cost would be commensurate with or less than the savings gained from its use, either from prevention of metal loss or retention of original surface condition.

The coatings described hereinafter are all characterized by a majority of the properties itemized above.

In general the temporary protective ceramic coatings field can be divided into three broad areas on the basis of temperature and, to some extent, on the reactions likely to be encountered in these temperature ranges. In most common steels and, more particularly, in some of the more recently developed tool steels, decarburization is likely to occur at relatively low temperatures of 1300° F. to 1850° F. Oxidation will also occur in this temperature range, although in developing the optimum metallurgical requirements in the substrate metal decarburization is often considered to be the more critical reaction. In general I use a vitreous-type coating to prevent such reactions. Owing to the mass of the metal often encountered and the low temperatures involved, the coatings used in this range are most readily removed by chemical treatment or by mechanical means.

An intermediate temperature range from 1800° to 2200° F. may be encountered with stainless steels and other high alloys where annealing or heat-treating operations are used in order to develop the desired metallurgical characteristics. Owing to the low carbon content of such metals and their inherently greater resistance to oxidation, I use coatings of considerably different compositions from those in the first temperature range although they are still basically of a vitreous nature. They may, however contain certain comminuted crystalline components in order to develop the appropriate thermal spalling characteristic.

The third temperature range encountered may be described as a hot-working range and may involve temperatures as high at 2400° F. Since size reduction and shape change may follow heat treatments of this nature, the characteristics of the coating may require considerable alteration. Where oxidation protection alone is desired for one reason or another, a vitreous-type coating may be satisfactory. On the other hand, where operations such as forging and hot rolling are to follow, the lubricity characteristics of the coating material are paramount and may require the utilization of a coating which is entirely crystalline in nature or one with only a minor amount of a vitreous component.

For all three temperature ranges I have developed different coating compositions providing either adequate oxidation protection or decarburization resistance or both. See copending applications Ser. Nos. 357,255, 357,136, and 357, 137, all assigned to the same assignee as the present application.

In addition, the inorganic materials which have been utilized can be suspended and dispersed in an aqueous carrier or in an organic vehicle containing one or another type of solidifiable resin, such that when the coating is applied and dried it has sufficient strength to permit handling and some abuse. This insures that the coating will remain in place until the coated metal part has been transported to and inserted in the heat-treating or annealing furnace. The optimum organic components are such that they are readily eliminated within the furnace without destroying the continuity of the coating or leaving residual matter which may interfere with the efficacy of the inorganic components of the coating system. I have found that suitable organic materials are those which have a total residue (carbon plus ash), as determined by the Conradson test or equivalent tests, less than about 3.50% by weight. The Conradson test is described in ASTM Standards, 1946, part III–A, page 120.

Thus, the high temperature coating systems which are hereinafter described deal not only with the new comminuted inorganic components but also with the liquid aqueous binder carrier(s) and the liquid, organic solidifiable resin binder carrier(s).

The inorganic components of the present invention comprise a combination of comminuted refractory alumino-silicate material(s) from the sillimanite minerals group (sillimanite, kyanite, andalusite, mullite) in conjunction with sodium silicate (hydrous or anhydrous, both in either liquid or powder form). Sillimanite, kyanite and andalusite are composed of $Al_2O_3$ and $SiO_2$ in a 1:1 ratio. Mullite is composed of the same oxides but they are in the ratio of $3Al_2O_3$ to $2SiO_2$. Kyanite is the most readily available material of the group and hence is presently the cheapest. I accordingly prefer to use it.

The dry powdery forms of sodium silicate are preferred when the liquid carrier of the coating compositions is an organic volatile solvent solution of solidifiable organic binder material.

Accordingly, it is an object of this invention to provide novel high temperature ceramic coating compositions utilizing said comminuted alumino-silicate material(s) and sodium silicate as the inorganic constituents.

Another object is to provide coatings of the kinds described utilizing either aqueous or organic vehicles as dispersing carriers for the inorganic components.

Another object is to provide novel coated metal articles in which the coating consists of a dried protective layer of the foregoing coating compositions.

These and other objects will be understood from the foregoing and following description of the invention taken in conjunction with the attached figure of drawings which is a side view of a coated metal article of the invention, having a portion of the coating 1 broken away to show the substrate metal 2.

The coatings described herein are designed primarily for use on stainless steels or other simple or complex alloys containing low or nil carbon content. This need not preclude their use on medium or high carbon content steels or alloys, should the need arise. The coatings exhibit the unusual quality of being self-healing at even moderately low temperatures (1300° F. and above).

In many heat-treating or annealing operations involving stainless steels, it is desirable that metal loss due to oxidation be prevented or that the original surface condition be maintained unchanged insofar as possible. This implies, therefore, particularly in regard to the latter requirement, that the coating be readily removable after the thermal processing operation. By proper design of the inorganic portion of the coating composition, it is possible to develop, through a severe mismatch of the thermal expansion coefficients of the coating and substrate metals, a sufficiently severe stress condition to cause spontaneous spalling from the metal surface. This stress may be either tensile or compressive in character. The latter is generally to be preferred since in some instances the inorganic materials required to develop a high coefficient of expansion are not sufficiently refractory to provide satisfactory resistance to oxidation in higher temperature ranges.

The temperature range for good protection is governed by (1) the ratio of sodium oxide to silica in the sodium silicate used and (2) the ratio of alumino-silicate refractory material to sodium silicate.

Oxidation resistance is developed in coatings formulated within the following critical ranges of composition:

| | Percent |
|---|---|
| Refractory | 70–95 |
| Sodium silicate | [1] 30–5 |

[1] Calculated on anhydrous basis.

The sodium silicates used can have sodium oxide to silica ratios on a weight basis from about 1:1 ($Na_2O.SiO_2$) to about 3:10 ($Na_2O.3.33SiO_2$). The preferred ratio is about 1:2 ($Na_2O.2SiO_2$).

When coating systems formulated as indicated above are used on a metal such as a stainless steel which is fairly resistant to oxidation up to a temperature where the coating becomes impermeable, subsequent protection at higher temperatures is satisfactory. When the same coating is used on other materials such as tool steels, however, oxidation may occur prior to the development of the impervious layer.

Heating rates also affect the behavior of the coating to some extent. If the temperature increase can be made sufficiently rapid, the coating will develop its impermeable structure with negligible oxidation of the metal.

The following examples illustrate the principles of the invention and include the best modes presently known to me for practicing the invention in accordance with these principles.

Example I

The following materials are blended together with a propellor-type mixer:

| | Parts by wt. |
|---|---|
| Kyanite (minus 100 mesh) | 80 |
| Sodium silicate powder [1] | 20 |
| Organic vehicle (Acryloid F-10 [2], 58% (wt.); mineral spirits, 41% (wt.); aluminum stearate, 1% (wt.)) | 35 |

[1] Anhydrous powder; $Na_2O:2SiO_2$.
[2] Acryloid F-10 is a solvent solution of poly(butyl methacrylate) resin; 40% solids; Gardner-Holdt viscosity (at 40% solids) of G. The resin has a specific gravity of 0.91.

This composition can be applied by dipping the metal into it, or it can be sprayed by diluting it further with mineral spirits or other compatible volatile solvent.

In one test of the above composition, the coating was diluted and sprayed on a stainless steel bar to a dry thickness of 8 mils. The wet coating was dried in air, then the coated bar was heated at 2350° F. for two hours in a gas/air furnace having an oxidizing flame. After the two-hour heating the coated bar was removed from the furnace and allowed to cool in air. The coating spalled off during cooling to expose a surface condition of the stainless steel unchanged from its original condition.

Example II

The organic vehicle of Example I is replaced with a vehicle composed as follows:

| | Percent |
|---|---|
| Vinyl toluenated alkyd resin [1] | 28.2 |
| Xylene or naphtha (or mixtures) | 71.8 |

[1] This thermosetting resin leaves a residue (carbon plus ash) of about 3.50% by weight when subjected to a Conradson or equivalent test.

When the test of Example I is repeated with the above-modified coating composition, equally good protection is shown. The test illustrates that binders of relatively-high Conradson residues can be used satisfactorily with no detrimental results to the underlying metal.

Example III

The coating composition of Example I is again modified by replacing the organic vehicle thereof with an equal weight of an aqueous emulsion binder carrier composed as follows:

| | By weight percent |
|---|---|
| Rhoplex AC-33 [1] | 55.6 |
| Vinsol emulsion [2] | 44.4 |

[1] Rhoplex AC-33 is a nonionic alkaline aqueous emulsion of an acrylic ester polymer; pH 9-9.5; 46-47% solids (wt.). The acrylic ester polymer has a $T_f$ of 28° C.; that is, it forms a continuous film at about room temperature.
[2] Vinsol emulsion is an anionic oil-in-water emulsion having a solids content of 50% (wt.); the internal (oil) phase is a hard pine resin which is insoluble in hydrocarbon solvents and has a methoxy content of 3-7% (wt.).

The blended emulsions give a carrier which leaves about 0.2% of residue (carbon plus ash) when subjected to the Conradson or equivalent tests.

When the test of Example I is repeated using the above-modified coating composition, equally good protection is secured.

The blended aqueous emulsion carrier of Example III can have its component emulsions in a range of proportions. The most suitable range is as follows:

| | Weight percent |
|---|---|
| Rhoplex AC-33 | 65-40 |
| Vinsol emulsion | 35-60 |

As will be understood, the use of aqueous emulsions gives wet coating compositions in which the viscosity is substantially that of a water solution of sodium silicate. The viscosity can be varied by diluting with water.

Example IV

The following materials are blended together in a porcelain ball mill until the resulting grind contains particles finer than about 100 mesh:

| | Parts by weight |
|---|---|
| Kyanite | 80 |
| Sodium silicate (liquid) [1] | 20 |
| Water | 35 |

[1] Aqueous, anhydrous sodium silicate $Na_2O.2SiO_2$; specific gravity of 59.3° Bé.

The composition needs to be thinned slightly with water to secure a good dipping viscosity and with greater dilution acquires a spraying viscosity.

In a test, the composition is diluted slightly and a stainless steel bar is dipped into it. The coating, when dry, had a thickness of about 7 mils. The wet-coated bar is dried in air at room temperature and then is heated at 2350° F. for two hours in a gas/air furnace having an oxidizing flame. Then the coated bar is removed and allowed to cool in air. The coating spalls off during cooling and the underlying metal surface is substantially unchanged from its initial condition.

The composition of Example IV has a good shelf-life in its as-formulated condition, and hence can be kept on hand for long periods of time. Shortly before use, it can be diluted with water, as necessary, for the adopted method of application.

Likewise, the coating compositions of Example I and II have satisfactory shelf-life in their as-formulated and as-thinned conditions. The composition of Example III has satisfactory shelf-life because of the anionic and nonionic natures of the emulsions employed.

Example V

When Example I is repeated except for using 70 parts of kyanite with 30 parts of sodium silicate, the resulting composition provides good oxidation-protection to tool steels. When the proportions are again altered so as to use 95 parts of kyanite and 5 parts of sodium silicate, the resulting composition affords fully-satisfactory protection for stainless steels of all common chemical analysis.

Example VI

The aqueous anhydrous sodium silicate of Example IV can be replaced with an equivalent weight of either hydrous sodium silicate powder or liquid hydrous sodium silicate, with equally good protection being secured.

It will be understood that the aqueous liquid binder carriers of the examples can be replaced in toto with aqueous solutions or emulsion of a wide variety of solid or solidifiable resinous organic binding materials which have a total Conradson residue less than about 3.5% by weight (ASTM Standards, 1946, part III-A, page 120) such as cellulose derivatives, glyceride drying oils, maleinized and amine-neutralized glyceride drying oils, rosin, maleinized and amine-neutralized rosin, nitrocellulose, carboxymethyl cellulose, cellulose acetate, cellulose butyrate, phenol/formaldehyde condensation products in various stages of resinification, amine/aldehyde and/or alkylated amine/aldehyde condensation products in various stages of resinification, thermoplastic copolymer resins, thermosetting copolymer resins or thermosetting reactive blends, etc. The water-insoluble materials can, if desired, also be used as binders in Examples I and II by dissolving them in single or mixed volatile organic solvents.

While the examples illustrate removal of the temporary ceramic coatings by self-spalling, it is well-known that ceramic coatings which do not spall can be removed by dissolution methods without harming the substrate, such as by immersing the coated article in hot aqueous caustic solutions, e.g. U.S. Patent No. 2,870,048. Sand blasting can also be used to remove such non-spalling coatings.

As stated hereinabove, sillimanite, kyanite, andalusite and mullite are functional equivalents for the purposes of the invention. Accordingly the kyanite of the examples can be replaced with any of the other minerals or with mixtures of said minerals.

Having described my invention, what I claim is:

1. A temporary ceramic coating composition for metals to be heated up to temperatures of about 2400° F. which consists essentially of:
    (A) a comminuted inorganic mixture consisting essentially of from about 70 to about 95 weight percent of an alumino silicate material of the sillimanite minerals group, and from about 30 to about 5 weight percent of sodium silicate having an $Na_2O:SiO_2$ ratio of between 1:1 and 3:10 by weight, said sodium silicate being calculated on an anhydrous basis with respect to the foregoing weight proportions and being in a form selected from the group consisting of anhydrous sodium silicate powder, aqueous anhydrous sodium silicate, hydrous sodium silicate powder, aqueous hydrous sodium siilcate, and mixtures thereof, and
    (B) an innocuous liquid carrier comprising organic polymeric binder material having a Conradson residue of less than about 3.5% by weight in which said comminuted inorganic mixture is dispersed and suspended for application purposes.

2. A coating composition as claimed in claim 1 wherein said liquid carrier consists essentially of an oil-in-water emulsion in which the dispersed phase consists essentially of organic binder material having a Conradson residue of less than about 3.50% by weight, and wherein said sodium silicate is in the form of powder.

3. A composition as claimed in claim 1 wherein said liquid carrier consists essentially of an organic volatile solvent solution of solidifiable organic binder material, said organic binder material having a Conradson residue of less than about 3.50% by weight.

4. A coating composition as claimed in claim 3 wherein said sodium silicate has an $Na_2O:SiO_2$ ratio of about 1:2 by weight.

5. A coating composition as claimed in claim 2 wherein said sodium silicate has an $Na_2O:SiO_2$ ratio of about 1:2 by weight.

6. A coating composition as claimed in claim 1 wherein said sodium silicate has an $Na_2O:SiO_2$ ratio of about 1:2 by weight.

7. A coating composition as claimed in claim 6 wherein said alumino-silicate material is kyanite.

8. A coating composition as claimed in claim 5 wherein said alumino-silicate material is kyanite.

9. A coating composition as claimed in claim 4 wherein said alumino-silicate material is kyanite.

10. A coating composition as claimed in claim 9 wherein said kyanite amounts to about 80% and said sodium silicate is about 20%.

11. A coating composition as claimed in claim 8 wherein said kyanite amounts to about 80% and said sodium silicate is about 20%.

12. A coating composition as claimed in claim 7 wherein said kyanite amounts to about 80% and said sodium silicate is about 20%.

13. A metal article having its surface coated with a dry protective film of the composition claimed in claim 1.

14. A metal article having its surface coated with a dry protective film of the composition claimed in claim 4.

15. A metal article having its surface coated with a dry protective film of the composition claimed in claim 5.

16. A metal article having its surface coated with a dry protective film of the composition claimed in claim 6.

17. A metal article having its surface coated with a dry protective film of the composition claimed in claim 10.

18. A metal article having its surface coated with a dry protective film of the composition claimed in claim 11.

19. A metal article having its surface coated with a dry protective film of the composition claimed in claim 12.

References Cited

UNITED STATES PATENTS

| | | | |
|---|---|---|---|
| 1,842,970 | 1/1932 | Hovey | 106—48 |
| 1,924,311 | 8/1933 | Frey | 106—65 |
| 2,160,873 | 6/1939 | Kerla | 106—65 |
| 2,611,153 | 9/1952 | Semegen | 117—6 XR |
| 2,612,457 | 9/1952 | Davis | 106—48 XR |
| 2,850,397 | 9/1958 | Dereich | 106—83 |
| 3,036,929 | 5/1962 | Kawashima et al. | 117—129 |
| 3,037,878 | 6/1962 | Cowles et al. | 106—48 XR |
| 3,178,322 | 4/1965 | Schneider | 117—6 XR |

FOREIGN PATENTS

| | | |
|---|---|---|
| 118,983 | 1918 | Great Britain. |
| 549,118 | 11/1957 | Canada. |

OTHER REFERENCES

Fabian: Strippable Coatings, Materials in Design Engineering, May 1959, pp. 110–115.

HELEN M. McCARTHY, Primary Examiner

U.S. Cl. X.R.

106—65, 84; 117—6, 129; 148—18, 20, 28